Oct. 2, 1923.

W. H. SNYDER ET AL 1,469,763

DIAPHRAGM

Original Filed Nov. 15, 1920

Inventors.
Ward H. Snyder,
and Frank F. Farkas
By Benjamin, Bradshaw & Lundy
Attys.

Patented Oct. 2, 1923.

1,469,763

UNITED STATES PATENT OFFICE.

WARD H. SNYDER AND FRANK F. FARKAS, OF CHICAGO, ILLINOIS.

DIAPHRAGM.

Original application filed November 15, 1920, Serial No. 424,080. Divided and this application filed November 6, 1922. Serial No. 599,193.

*To all whom it may concern:*

Be it known that we, WARD H. SNYDER and FRANK F. FARKAS, citizens of the United States, residing at Chicago, in the county of Cook and State of Illinois, have invented certain new and useful Improvements in a Diaphragm, of which the following is a specification.

Our present application constitutes a division of certain subject-matter first set forth in our pending application for United States Letters Patent for Shutter controlling mechanism, filed November 15, 1920, Serial No. 424,080, and relates to improvements in diaphragms. Diaphragms, as used in this connection are instruments for controlling the passage of light and are highly desirable, if not necessary, elements in photography and optics in general.

The amount of light which reaches a particular locality or area depends upon the distance of the area or location from the source of illumination, which, so far as the present problem is concerned, is the means of light control, or the diaphragm itself, the extent to which the diaphragm is opened, or better still the relation between the extent of the diaphragm opening and the distance between the opening and the area under illumination, and the time during which the location or area is exposed to illumination. These three circumstances bear to each other the relation of factors; that is no change can be made in either of them without working definite and exact changes in the other two.

The objects of the invention herein described are to provide a simple adjustable diaphragm which may be economically made and distributed at an economical price, and which is provided with two controls capable of being operated either independently or together, and the operation of which, by the employment of suitable indicia, may be related in the ratio of the time and diaphragm opening factors above alluded to. We attain the foregoing objects by means of the structure illustrated in the accompanying drawing, in which—

Figure 1:
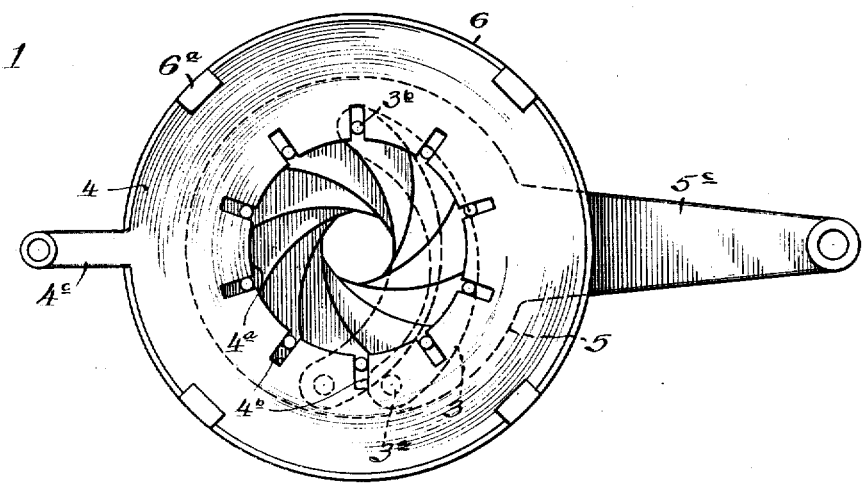
Figure 2:
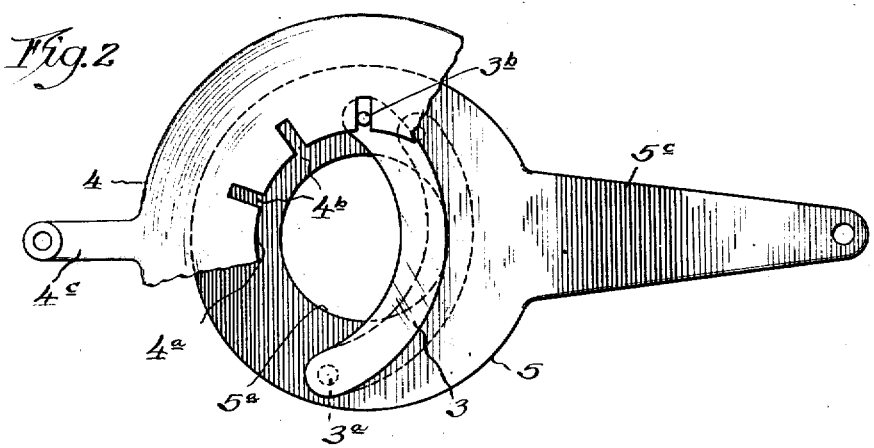

Fig. 1 shows one use to which our invention may be put and is an elevation of a front or lens board of a camera with our improved diaphragm mounted thereon; and Fig. 2 is a schematic fragmental detail showing a diaphragm blade or leaf and the relation of the control elements thereto.

Similar reference characters refer to similar parts in the respective views.

The diaphragm comprises a plurality of arcuate or lune shaped blades or leaves 3 and two apertured elements preferably in the form of circular or disk shaped plates 4 and 5, the said plates being each provided with a central circular aperture $4^a$ and $5^a$ respectively. One of the apertured elements, say plate 4, has radial slots or castellations $4^b$ extending outwardly from the central aperture. Each blade 3 is pivoted by a suitable pin $3^a$ to plate 5, and at the other end is provided with a lateral pin $3^b$ which enters a slot or castellation $4^b$ in plate 4.

The plates and blades assembled as above described, the plates are, respectively, provided with arms $4^c$ and $5^c$ for more conveniently rotating them and the disks are mounted in any suitable manner to permit of rotation. This may be simply done by providing a centrally apertured disk 6 from the edge or perimeter of which extend tongues or tangs $6^a$. The assembled disks 4 and 5 and blades 3 are laid upon disk 6 and tongues or tangs $6^a$ are bent up and around the topmost disk.

From the foregoing description, taken in connection with the drawing, it will now be apparent that the rotation of either plate 4 or 5 will cause the respective blades to be either drawn toward or retired from the center of the structure according to the direction of the relative motion between plates 4 and 5. It will also be seen that plates 4 and 5 may be operated either independently or together which permits of their movements being related in the ratio of the factors of time and diaphragm as herein alluded to.

What we claim new is:

1. In a camera, a diaphragm having leaves, and two independently adjustable controlling elements; said leaves being subject to the joint control of said controlling elements.

2. A camera having a diaphragm having leaves and two independently rotatable rings, the leaves being pivoted at one end to one of the rings and at the opposite end connected to the other ring whereby the size of the opening is under the joint control of said rings.

3. A diaphragm comprising two rotatable centrally apertured plates, and a plurality of blades coactively related at their opposite ends to the respective plates.

4. A diaphragm comprising two rotatable apertured plates, a plurality of blades pivoted at one end in spaced relation to and concentrically of the aperture of one of said plates, the other of said plates being provided with a series of concentrically arranged spaced slots, and means upon the unsecured ends of said blades for engaging said slots.

5. A diaphragm comprising spaced apertured revoluble elements, and a plurality of blades interposed between said elements having a pivotal engagement at one end with one of said elements, and a sliding and pivotal engagement at the other end with the other of said elements.

6. A diaphragm consisting of a pair of apertured elements rotatable about a common axis, and a plurality of blades movably connected at their opposite ends to said respective elements, whereby the relative movement of said elements moves said blades toward or away from the axis of said elements.

7. A diaphragm comprising two rotatable apertured plates, and a plurality of blades each coactively connected to both of said plates whereby a relative movement between said plates changes the position of said blades.

8. A diaphragm consisting of a pair of apertured elements rotatable about a common axis, and a plurality of blades each movably connected to both of said elements whereby the relative movement of said elements moves said blades toward or away from the axis of said elements.

9. A diaphragm comprising mounting means, a plurality of blades movably mounted with respect to said means, and a plurality of control elements each operatively connected with all of said blades whereby a relative movement between said control elements changes the positions of the said blades.

10. A diaphragm comprising mounting means, a plurality of movable blades associated therewith, and a plurality of independently operable control elements each suitably connected with all of said blades whereby a relative movement between said control elements simultaneously changes the positions of said blades.

Signed at Chicago, county of Cook, and State of Illinois, this 31st day of October, 1922.

WARD H. SNYDER.
FRANK F. FARKAS.

Witnesses:
E. K. LUNDY, Jr.,
FLORENCE MITCHELL.